Figure 1A:
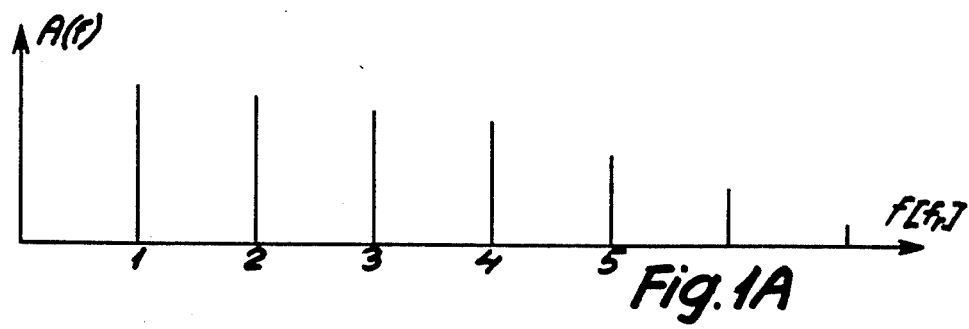

United States Patent [19]

Mogensen

[11] Patent Number: 4,600,303
[45] Date of Patent: Jul. 15, 1986

[54] METHOD IN THE SIGNAL PROCESSING OF A RECEIVED TRAIN OF PULSES, AND A RECEIVER FOR CARRYING OUT THE PROCESS

[75] Inventor: Gregers E. Mogensen, Bagsvaerd, Denmark

[73] Assignee: Aktieselskabet Nordiske Kabel- og Traadfabriker, Copenhagen, Denmark

[21] Appl. No.: 598,297
[22] PCT Filed: Aug. 4, 1983
[86] PCT No.: PCT/DK83/00075
§ 371 Date: Apr. 2, 1984
§ 102(e) Date: Apr. 2, 1984
[87] PCT Pub. No.: WO84/00613
PCT Pub. Date: Feb. 16, 1984

[30] Foreign Application Priority Data

Aug. 5, 1982 [DK] Denmark .................. 3508/82

[51] Int. Cl.⁴ .................. G01N 21/00; H04B 9/00
[52] U.S. Cl. .................. 356/73.1; 307/352; 328/151; 455/619
[58] Field of Search .................. 455/619, 612, 600, 608; 324/84; 356/73.1; 333/248; 331/25; 307/352; 328/151; 340/347 SH; 375/119

[56] References Cited

U.S. PATENT DOCUMENTS 3,869,680 3/1975 Fletcher et al. .................. 372/18
3,944,811 3/1976 Midwinter .................. 455/612
4,496,937 1/1985 Kitagawa et al. .................. 340/347 SH

OTHER PUBLICATIONS

Presby, H. M. et al, "Novel Bandwidth Measurement System for Short-Fiber Lengths", Rev. Sci. Instrum. 52(11), Nov. 1981, pp. 1660-1663.

Primary Examiner—Joseph A. Orsino, Jr.
Attorney, Agent, or Firm—Ladas & Parry

[57] ABSTRACT

A method in signal processing of a train of pulses with a stable, high repetition frequency $f_r$, in particular in connection with dispersion measurements of optical fibers, comprises sampling (1) of the received signal at a sampling frequency $f_s$, where $$f_s = (f_r \pm \Delta f)/n$$

(n is an integer and $\Delta f$ is several magnitudes smaller than $f_r$). When the sampling frequency is generated by a pulse generator (3), which, through a phase-detecting circuit (4), depends on partly a reference signal (from the oscillator 6) and partly a low frequency signal derived (via 5) from the signal received and sampled at the frequency $f_s$, a stable sampling frequency is obtained even though the signal/noise ratio on the input of the receiver is significantly smaller than was permissible in the past. When the method is to be carried out within a relatively narrow repetition frequency range, the oscillator (6) is preferably replaced by a frequency dividing circuit designed to generate a reference signal by division of the sampling frequency.

8 Claims, 6 Drawing Figures

METHOD IN THE SIGNAL PROCESSING OF A RECEIVED TRAIN OF PULSES, AND A RECEIVER FOR CARRYING OUT THE PROCESS

The invention relates to a method in detuned sampling of a train of pulses with a stable, high repetition frequency, $f_r$, received by a noise generating detector circuit, in particular for the measurement of pulse broadening through an optical fiber whose output end is coupled to the input of the detector.

The invention is particularly useful for the measurement of pulse broadening in a multimode optical fiber. Pulse broadening is also called dispersion and covers the phenomenon that the pulse width increases when a light pulse is propagated in the optical fiber, which is due to the fact that the various types of modes, which in combination form the signal, are propagated at slightly different velocities through the fiber because in practice the fiber cannot be made with ideal parameters. The pulse broadening substantially determines the transmission capacity of the fiber for tele-communication purposes in that increasing pulse broadening corresponds to decreasing bandwidth. It is therefore important that this measurement can be made in situ because it is not possible in practice to estimate the bandwidth of an optical fiber comprising several splices on the basis of knowing the bandwidth of each individual part of the fiber.

In principle, there are two different pulse broadening measuring methods. (See e.g. NBS special publication 597: Technical Digest Symposium on optical fiber measurements, 1980, p. 49–54). One method is called frequency sweep, where a signal of periodically varying frequency is applied to the input of the fiber. The frequency of the transmitted signal is analyzed on the output of the fiber, and information about the pulse broadening can be obtained by computation. Even though phase difference cannot be measured in practice by this process, it has been the predominant method of making measurements over great distances. This is so because the other method, called the pulse method, is vitiated by the drawback that it is not reliable when the attenuation in the optical fiber stretch is large, and this process is therefore mostly used for laboratory measurements where the fiber length and thus the attenuation is relatively small. In this method, attenuation is a problem because the noise of the detector is relatively great so that the signal/noise ratio is poor. The noise of the detector cannot be reduced right away since the detector must have such a large band width that its pulse response is small compared with the pulses transmitted through the optical fiber during the measurement. Therefore, in the known pulse method devices it was attempted to remedy the poor signal/noise ratio by using high power lasers as senders, but high power lasers can only operate at a significantly lower repetition frequency and at other wavelengths than the low power lasers which are used in practice for communication purposes; therefore this known measurement method will not completely reflect the fiber characteristics which are relevant in normal communication operations.

The object of the invention is to provide a method in the signal processing of a train of pulses, enabling the bandwidth of an optical fiber to be measured in accordance with the said pulse method even in those cases where the optical fiber has such a great attenuation that the previously known pulse measuring technique is inadequate when a laser of the same type as is used in practice for telecommunication is to be used in the pulse measuring sender.

This object is achieved in that the detuned frequency, $f_s$, at which the received signal is sampled, is given by $$f_s = (f_r \pm \Delta f)/n.$$

where n is an integer and $\Delta f$ is several magnitudes smaller than $f_r$, and that the sampling signal is generated by means of a pulse generator whose repetition frequency is controlled by means of a phase-detecting circuit, to which there are applied partly a reference signal indicative of the displacement frequency $\Delta f$, partly a low frequency signal derived from the signal received and sampled at the frequency $f_s$ and which has a sufficient bandwidth to contain essentially all the information in the signal received. When the sampling frequency is locked by means of a signal which has been transformed to a low frequency signal with a great signal/noise ratio because of the sampling, the locking will be effective even though the signal/noise ratio on the input of the receiver is significantly smaller than was permissible in the past. This obviates the limitation present in the previously known pulse measuring systems, viz. that the signal/noise ratio must be relatively large before sampling to ensure reliable triggering of the sampling oscilloscope used for the sampling in these systems.

It is known from the heterodyne art to mix a received signal and a local oscillator signal, where the frequency of the local oscillator depends upon the combined product, see e.g. the German Offenlegungsschrift No. 3 197 700. This art presupposes a sinusoidal local oscillator signal and band-pass filtration in a relatively narrow medium frequency range so that a predominant part of the information in a pulse signal would be lost. For example, an optical fiber may have a bandwidth of 300 MHz corresponding to pulse broadening of 1 ns. Referring to the examples of the measuring frequency given later in the description, the information is contained in up to 40 harmonics of both the repetition and the displacement frequencies, and it will therefore be appreciated that the heterodyne art, which would only include one harmonic owing to band-pass filtration in the medium frequency range, is inadequate. When a pulse sampling signal is used together with a wide-band sampling circuit, the harmonic row of the repetition frequency forming the output signal (see FIG. 1A) will be transformed to an equivalent harmonic row of the displacement frequency, and low pass filtration of this signal will provide a significant reduction in noise when the measuring frequencies are of the magnitudes given as examples in the following description are used.

The reference signal to the phase-detecting circuit may be generated by means of a separate local oscillator, and in this connection the controlled pulse generator might be a frequency synthesizing network, but the reference signal is preferably generated by dividing the output frequency of the pulse generator in connection with a pulse oscillator with a relatively small tuning range, as for most uses the method will be carried out at a determined repetition frequency, preferably 8 MHz.

When the displacement frequency $\Delta f$ is selected to be between 10 and 100 Hz, an advantageous compromise is obtained between direct display of the output signal, transformed to low frequency, on an ordinary low frequency real-time oscilloscope, and sufficient improvement in the receiver sensitivity for measurements to be made over the fiber lengths occurring in practice, as well as realization of the circuits without great problems of stability.

The invention also concerns a receiver for carrying out the process of the invention, said receiver comprising an optical receiver and a filter for sampling and signal processing a received train of pulses with a stable, high repetition frequency $f_r$, said filter comprising a sampling circuit and a phase-detecting control circuit designed to adjust a sampling frequency $f_s$ by phase comparison of a reference signal indicative of a displacement frequency, $\Delta f$, and a signal received on an additional input of the detector.

The purpose of the receiver is to allow the method to be carried out considerably more simply and cheaply than the known pulse measuring systems. This is achieved in that a pulse generator is controlled by the said control circuit so that $$f_s = (f_r \pm \Delta f)/n,$$

where n is an integer, and that the additional input of the control circuit is connected to the output of the sampling circuit through a low pass filter.

The phase-detecting control circuit has preferably two inputs; it should be noted that one input receives the sampled version of the signal received by the receiver, while a reference input on the phase-detecting control circuit is connected to the output of the pulse generator through a frequency dividing circuit with a dividing ratio of $f_s/\Delta f$.

The smaller n is, the greater the signal/noise ratio will be. It is presupposed in the description given in the following that n=1, which provides for maximum increase in the signal/noise ratio of the receiver. A corresponding increase cannot be obtained in the known systems using sampling oscilloscopes because their maximum sampling frequency is typically 100 kHz, which with the preferred repetition frequency of 8 MHz results in n=80.

When a high frequency pulse shaping circuit is provided before the sampling unit and a low frequency pulse shaping circuit after this unit, the aforesaid structure can be optimized in a better manner than is feasible with a single pulse shaping circuit.

Insertion of the low frequency pulse shaping circuit in the connection between the output of the sampling unit and the additional input of the phase-detecting control circuit provides for utilization of the optimum great signal/noise ratio at this point to further improve the sampling accuracy of the sampling unit even with a very low signal/noise ratio on the input of the receiver.

Figure 1B:
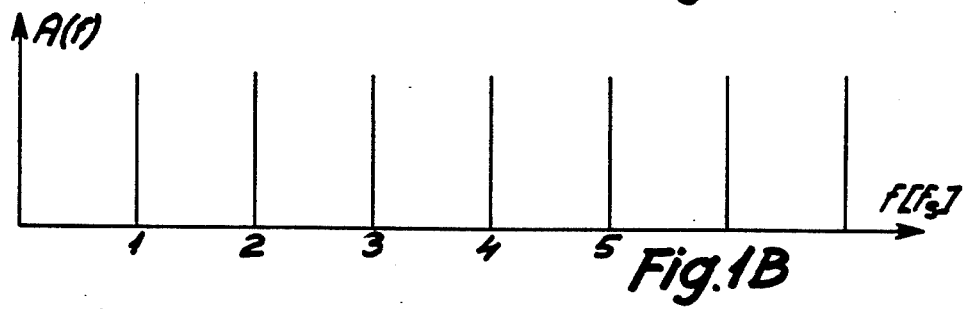
Figure 1C:
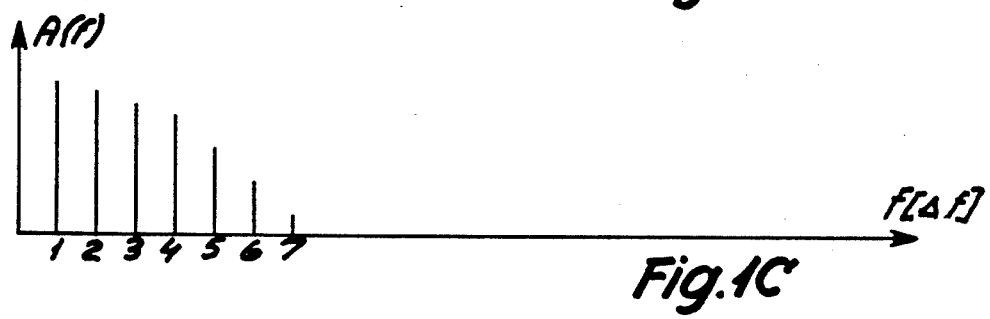
Figure 2:
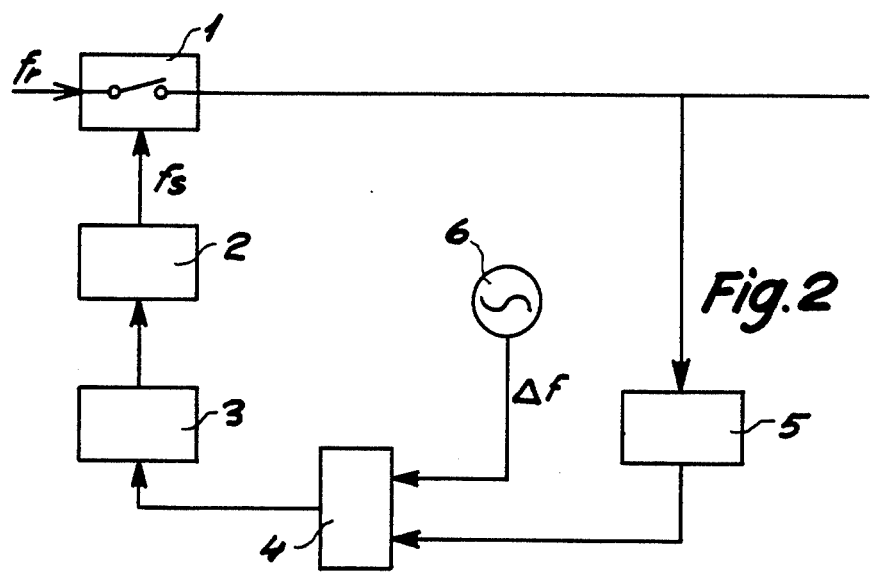
Figure 3A:
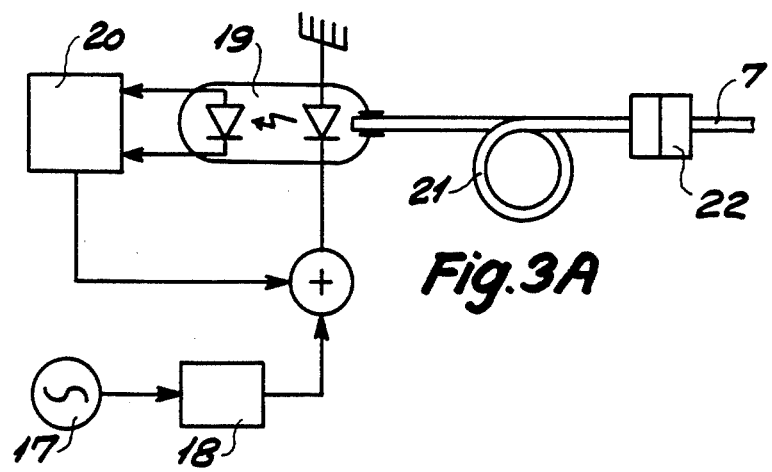
Figure 3B:
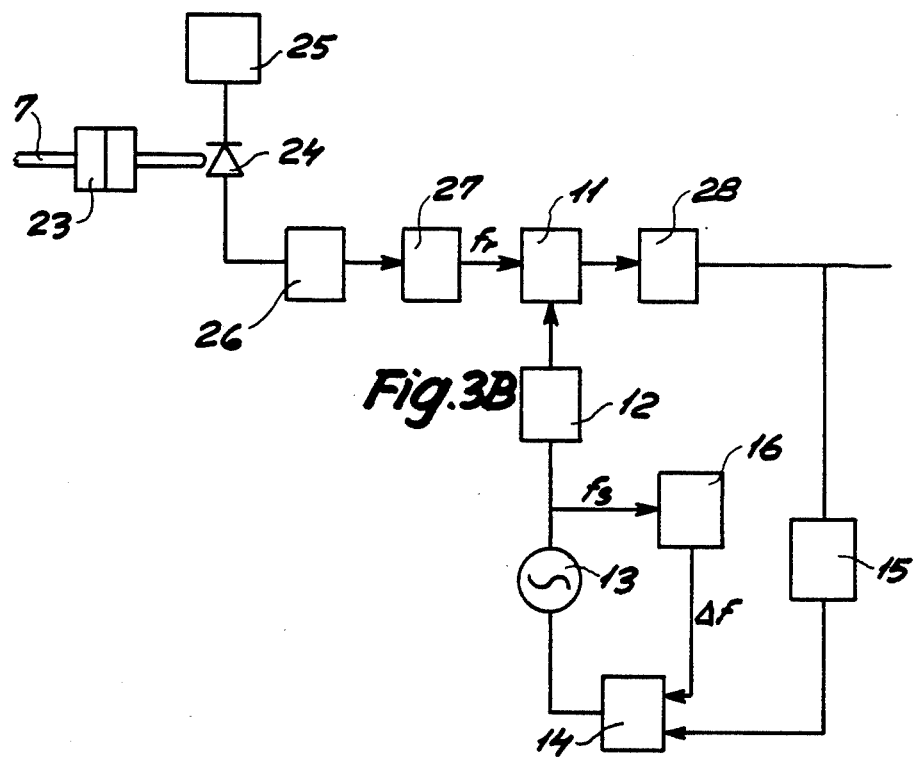

The invention will be explained more fully by the following description of some preferred embodiments with reference to the drawing, in which FIGS. 1A–C show a part of the frequency spectrum of signals occurring in the circuit shown in FIG. 2, with the frequency indicated in units of $f_r$, $f_s$, and $\Delta f$, respectively, FIG. 2 shows a simplified block diagram of a circuit serving to illustrate the method of the invention, while, FIGS. 3A and 3B show a sender and a receiver, respectively, as the preferred system for carrying out the method.

FIGS. 1A and 1B show parts of the frequency spectrum of pulse trains, where the repetition frequencies are e.g. $f_r = 8$ MHz and $f_s = 7.99992$ MHz, respectively.

When the first pulse train is sampled at the repetition frequency of the second pulse train, a spectrum results whose low frequency part is shown in FIG. 1C, with a fundamental frequency $\Delta f$ corresponding to the difference between the repetition frequencies of these pulse trains. As the displacement frequency $\Delta f$, which is 80 Hz in the preferred embodiment, is several magnitudes smaller than $f_r$ and $f_s$, FIG. 1C is scaled differently from FIGS. 1A and 1B. It is noted that these frequencies only serve as an example and thus do not restrict the field of use of the invention.

The block diagram shown in FIG. 2 of a signal processing unit according to the invention comprises a sampling unit 1, which is designed to sample an input signal with a repetition frequency $f_r$, which may have the spectrum shown in FIG. 1A, at a sampling frequency $f_s$, where the sampling signal is generated by a pulse generator 2 and may have the spectrum shown in FIG. 1B. The pulse generator 2 is controlled by an adjustable oscillator 3 which is adjusted by means of the output signal from a phase-detecting circuit 4, so that $$f_s = (f_r \pm \Delta f)/n,$$

where n is an integer and $\Delta f$ is several magnitudes smaller than $f_r$. As mentioned, the output signal from the sampling unit 1 contains a fundamental frequency $f_r - nf_s$, which is e.g. 80 Hz. This signal is transmitted via an amplitude limiting filter 5 to one input of the phase-detecting circuit 4, whose other input is connected to a local oscillator 6 adjusted to the frequency $\Delta f$.

The advantage provided by the circuit of FIG. 2 is that the sampling frequency $f_s$ can be controlled very accurately with respect to the pulse repetition frequency $f_r$, even though the signal/noise ratio on the input of the sampling unit 1 is poor. This is due to the fact that the sampling and a subsequent low pass filtration of the sampled signal involve a significant increase in the signal/noise ratio, to thereby provide for a precise sampling frequency $f_s$ at frequencies right up to 100 MHz. In the circuit shown in FIG. 2 this low pass filtration may be contained in the limiting filter 5, which also causes limitation in amplitude necessary for the most common phase-detecting circuits. However, it is also possible to have phase-detecting circuits which do not require a separate low pass filtration of the sampled signal.

The circuit shown in FIG. 2 in principle allows all possible repetition frequencies $f_r$, but this presupposes that the adjustable oscillator 3 is a relatively expensive frequency synthetizing network with a wide frequency range, and that the frequency of the oscillator 6 can be varied to provide for optimum operation at all repetition frequencies. Another general prerequisite of the operation of the circuit is that the repetition frequency $f_r$ is very precise because it must be phase-stable owing to the sampling and be frequency-stable with a variation which is somewhat smaller than the frequency of the oscillator 6 in order for the phase-detecting circuit 4 to be able to lock the sampling frequency $f_s$.

The invention is particularly expedient in connection with measurements of dispersion in optical fibers where the vast majority of measurements allow the use of a fixed repetition frequency, which can be generated relatively easily so as to satisfy the above-mentioned requirements. Thus, the circuit shown in FIG. 2 can also be made less general and thus cheaper, e.g. as shown in the receiver in FIG. 3B.

FIGS. 3A and 3B show a sender and a receiver, respectively, for a system for measuring dispersion through an optical fiber 7. The sender is designed to send short light pulses (about 0.7 ns) into the fiber 7, and the receiver is designed to detect the pulse response of the fiber. To obtain a measurement accuracy as great as possible, both the transmitted pulse and the pulse response of the receiver must be short compared with the pulse response of the fiber, which requires a wide band width in the receiver whose sensitivity is thus minimized. By means of the embodiment of the receiver of the invention shown in FIG. 3B, an improvement in the signal/noise ratio of about 25 dB can be obtained over the known receivers.

The sender shown in FIG. 3A comprises a stable oscillator 17 whose frequency $f_r$ is 8 MHz in the shown embodiment, has a total frequency unreliability which is significantly smaller than $\Delta f$, which is about 80 Hz in the shown embodiment. The oscillator 17 controls a pulse generator 18 which generates 0.7 ns wide current pulses of an amplitude of 20 to 50 mA, depending upon the laser type 19. A biassing circuit 20 serves to bias the laser 19 so that the peak level of the optical pulses is constant. The light pulses are transmitted to the optical fiber 7, for which the dispersion is to be measured, via a mode scrambler 21 and a coupling means 22. Like the previously mentioned components of the sender, the mode scrambler is known per se and is sufficient to ensure reproducible measurements on long fiber lengths. Additional coupling arrangements may be necessary in case of measurements on short lengths and in case of measurements where extreme reproducibility is required.

In the receiver of FIG. 3B the optical fiber 7 is coupled via a coupling means 23 to an avalanche photodetector 24 connected partly to a biassing circuit 25, partly to an input circuit 26. The input circuit 26 is designed as a known input stage and moreover contains automatic amplification adjustment so that the overload level of the receiver is not exceeded. Leaving the pulse shaping circuits 27 and 28 temporarily out of consideration, the other components in the receiver 11–16 can in principle be compared with the components 1–6 in FIG. 2. The receiver thus comprises a sampling unit 11, a pulse generator 12, a controlled oscillator 13, a phase-detecting circuit 14, a filter 15 and a circuit 16 to generate the frequency $\Delta f$. As the receiver of FIG. 3B is designed to receive at a fixed repetition frequency $f_r$, the local oscillator 6 of FIG. 2 is not needed. The frequency $\Delta f$ is generated by frequency division of the output signal of the oscillator 13, the circuit 16 being designed to divide the frequency in the ratio $f_s/\Delta f$. Owing to the constant repetition frequency $f_r$ the oscillator 13 may be an ordinary, controlled oscillator with a relatively small tuning range, where the frequency $f_s$ is controlled by the output signal from the phase-detecting circuit 14, as was explained in connection with FIG. 2.

The receiver shown in FIG. 3B obviates the triggering problems associated with sampling oscilloscopes and caused by the poor signal/noise ratio in the input circuit 26. Since the sampling frequency is locked by means of the output signal where the signal/noise ratio is great, the receiver can operate with such a poor signal/noise ratio in the input circuit 26 that a low power laser 19 of the same type as is normally used in telecommunication types can be used in the sender (FIG. 3A).

Therefore, the receiver of the invention allows precisely those parameters to be measured which are relevant in ordinary telecommunication operation of the optical fiber 7. The sampling frequency in the receiver shown in FIG. 3B may moreover be as high as 100 MHz without much difficulty so that a sample can be taken in each pulse repetition period. In the preferred embodiment the pulse repetition frequency is selected at 8 MHz, which is an expedient compromise between the fact that a high frequency causes transmission of the greatest possible amount of energy, and the fact that the frequency is not higher than the pulse responses from the most dispersive fiber to be measured do not overlap each other. A repetition frequency of 8 MHz involves a spacing between the transmission pulses corresponding to 4 times the time pulse period for a 34 Mb/s signal.

Usually, the input circuit 26 is designed to give the best possible signal/noise ratio, which causes distortion of the pulses so that equalization is necessary. According to the invention, equalization is obtained by means of two pulse shaping circuits 27 and 28 which are disposed on their respective sides of the sampling unit 11; this has been found to be very instrumental in optimizing the compensation for counter-acting distortion from the input circuit 26. Therefore, when the output signal from the pulse shaping circuit 28 is used as the input signal to the phase-detecting circuit 14, optionally further filtered in the limiter 15, the capability of the circuit to lock the sampling circuit with respect to the high repetition frequency will be further improved.

As the output signal from the circuit 28 represents the received pulses with a repetition frequency of $\Delta f$, which is about 80 Hz here, the output signal can be displayed directly on a low frequency real time oscilloscope. However, the output signal can also be signal processed further in a manner known per, e.g. by means of a Fourier transformation circuit. Generally, the output signal can be transmitted to a data processing unit for further signal processing, storage, print-out, etc.

I claim:

1. A method in staggered sampling of a train of pulses with a stable, high repetition frequency, $f_r$, received by a noise generating detector circuit, in particular for the measurement of pulse broadening through an optical fibre whose output end is coupled to the input of the detector, characterized in that a received signal is sampled at a staggered frequency, $f_s$, which is given by $$f_s = (f_r \pm \Delta f)/n$$

where n is an integer and $\Delta f$ is several magnitudes smaller than $f_r$, and that a signal for the sampling of the received signal is generated by means of a pulse generator whose repetition frequency is controlled by means of a phase-detecting circuit, to which there are applied a reference signal indicative of the displacement frequency $\Delta f$, and a low frequency signal derived by sampling of the received signal at the frequency $f_s$, which low frequency signal has sufficient band width to contain essentially all the information in the signal received.

2. A method according to claim 1, characterized in that the reference signal of the phase-detecting circuit is generated by division of the output frequency of the pulse generator.

3. A method according to claim 1 characterized in that n=1 giving, when using $f_s < f_r$, $f_s = f_r - \Delta f$, where f is between 10 and 100 Hz, preferably corresponding to five magnitudes smaller than $f_s$.

4. A receiver for staggered sampling of a train of pulses, comprising an optical receiver and a filter for sampling and signal processing a received train of pulses having a stable, high repetition frequency $f_r$, said filter comprising a sampling circuit and a phase-detecting control circuit designed to adjust a sampling frequency $f_s$ by phase comparison of a reference signal indicative of a displacement frequency, $\Delta f$, and a signal received on an additional input, characterized by the provision of a pulse generator controlled by the said control circuit so that $$f_s = (f_r \pm \Delta f)/n,$$

where n is an integer, and that the additional input of the control circuit is connected to the output of the sampling circuit through a low pass filter.

5. A receiver according to claim 4, characterized by the provision of a frequency dividing circuit with a dividing ratio of $$f_s \Delta f,$$

said circuit being connected between the output of the controlled pulse generator and the reference input of the phase-detecting control circuit.

6. A receiver according to claim 4, characterized in that n is smaller than 10.

7. A receiver according to claim 4, comprising pulse shaping circuits for counter-acting distortion in the optical receiver, characterized by a high frequency pulse shaping circuit disposed in front of the sampling circuit and a low frequency pulse shaping circuit disposed after the sampling circuit.

8. A receiver according to claim 7, characterized in that the low frequency pulse shaping circuit is inserted in the connection between the output of the sampling unit and the additional input of the phase-detecting control circuit.

* * * * *